United States Patent
Polakowski et al.

(10) Patent No.: US 11,976,983 B2
(45) Date of Patent: May 7, 2024

(54) TEMPERATURE SENSING CIRCUIT INCLUDING MULTIPLE THERMISTORS

(71) Applicant: MILWAUKEE ELECTRIC TOOL CORPORATION, Brookfield, WI (US)

(72) Inventors: Matthew R. Polakowski, Greenfield, WI (US); Kyle C. Fassbender, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 725 days.

(21) Appl. No.: 17/051,534

(22) PCT Filed: May 28, 2020

(86) PCT No.: PCT/US2020/034895
§ 371 (c)(1),
(2) Date: Oct. 29, 2020

(87) PCT Pub. No.: WO2020/243283
PCT Pub. Date: Dec. 3, 2020

(65) Prior Publication Data
US 2023/0160758 A1 May 25, 2023

Related U.S. Application Data

(60) Provisional application No. 62/854,690, filed on May 30, 2019.

(51) Int. Cl.
*G01K 7/22* (2006.01)
*G01K 3/06* (2006.01)
*G05B 15/02* (2006.01)

(52) U.S. Cl.
CPC ................ *G01K 7/22* (2013.01); *G01K 3/06* (2013.01); *G05B 15/02* (2013.01)

(58) Field of Classification Search
CPC ............. G01K 7/22; G01K 3/06; G05B 15/02
See application file for complete search history.

(56) References Cited

U.S. PATENT DOCUMENTS 7,812,705 B1    10/2010  Kozhukh et al.
2005/0238080 A1 10/2005  Wolkin et al.
(Continued)

FOREIGN PATENT DOCUMENTS

EP    794415 A1 *  9/1997  ............... G01J 5/24

OTHER PUBLICATIONS

International Search Report and Written Opinion for Application No. PCT/US2020/034895 dated Sep. 15, 2020 (10 pages).
(Continued)

*Primary Examiner* — Mark A Connolly
(74) *Attorney, Agent, or Firm* — Michael Best & Friedrich LLP

(57) ABSTRACT

Temperature sensing circuits for devices described herein include a substrate material, a first conductive portion, a second conductive portion, and a third conductive portion associated with the substrate material, and a plurality of thermistors associated with the substrate material for sensing a temperature associated with the device. The plurality of thermistors include a first thermistor and a second thermistor. The first thermistor is connected to the first conductive portion. The first thermistor and the second thermistor are both connected to the second conductive portion. The second thermistor is connected to the third conductive portion.

16 Claims, 8 Drawing Sheets

(56) References Cited

U.S. PATENT DOCUMENTS

| | | | |
|---|---|---|---|
| 2010/0327815 A1* | 12/2010 | Johnson | H01M 10/482 |
| | | | 320/136 |
| 2013/0004811 A1 | 1/2013 | Banerjee et al. | |
| 2017/0279290 A1 | 9/2017 | Johnson et al. | |
| 2018/0198294 A1 | 7/2018 | Sheeks et al. | |
| 2019/0006980 A1 | 1/2019 | Sheeks et al. | |

OTHER PUBLICATIONS

Extended European Search Report for Application No. 20813671.3 dated May 25, 2023 (8 pages).

\* cited by examiner

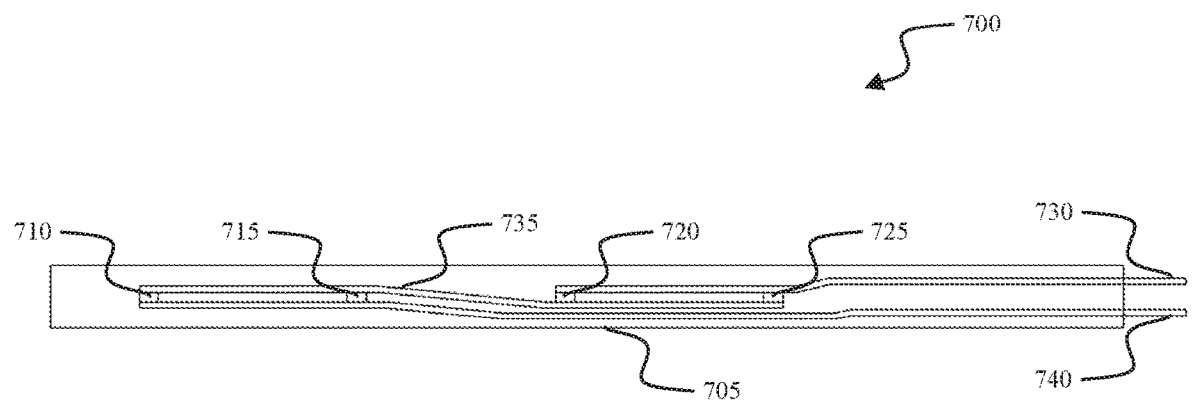
FIG. 7A
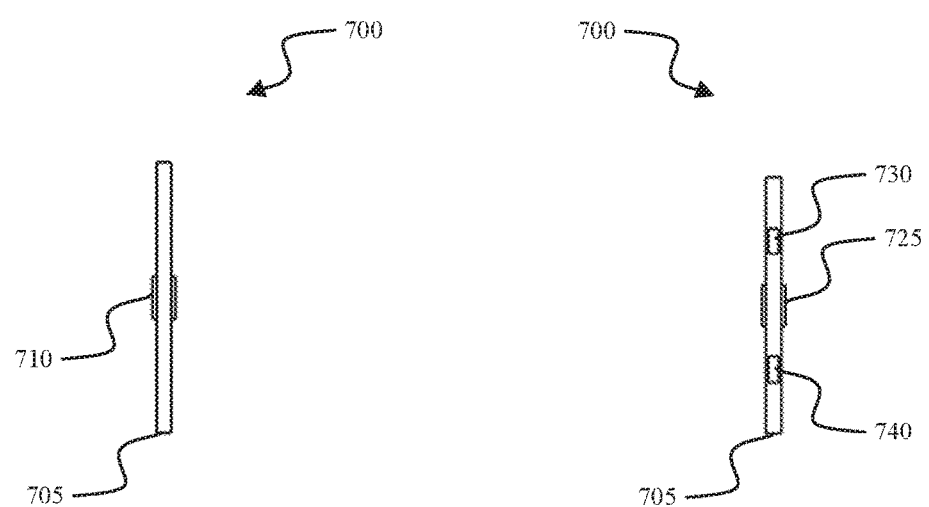
FIG. 7B
FIG. 7C

TEMPERATURE SENSING CIRCUIT INCLUDING MULTIPLE THERMISTORS

RELATED APPLICATIONS

This application is a national phase filing under 35 U.S.C. § 371 of International Application No. PCT/US2020/034895, filed May 28, 2020, which claims priority to U.S. Provisional Patent Application No. 62/854,690, filed May 30, 2019, the entire content of which is incorporated herein by reference.

FIELD

Embodiments described here related to a temperature sensing circuit for a device, such as an electrical device.

SUMMARY

Temperature sensing circuits for devices described herein include a substrate material, a first conductive portion, a second conductive portion, and a third conductive portion associated with the substrate material, and a plurality of thermistors associated with the substrate material for sensing a temperature associated with the device. The plurality of thermistors include a first thermistor and a second thermistor. The first thermistor is connected to the first conductive portion. The first thermistor and the second thermistor are both connected to the second conductive portion. The second thermistor is connected to the third conductive portion.

Methods of determining a temperature associated with a device described herein include sensing a temperature associated with the device using a temperature sensing circuit, receiving, by a controller, a signal from the temperature sensing circuit, and determining the temperature associated with the device based on the signal. The signal corresponds to an average of temperatures sensed by the plurality of thermistors. The device includes the temperature sensing circuit connected to the controller of the device. The temperature sensing circuit includes a first conductive portion, a second conductive portion, and a third conductive portion associated with a substrate material. The plurality of thermistors include a first thermistor and a second thermistor. The first thermistor is connected to the first conductive portion. The first thermistor and the second thermistor are connected to the second conductive portion. The second thermistor is connected to the third conductive portion.

Temperature sensing circuits for devices described herein include a substrate material, a first conductive portion, a second conductive portion, and a third conductive portion associated with the substrate material, and a plurality of thermistors associated with the substrate material for sensing a temperature associated with the device. The plurality of thermistors include a first thermistor, a second thermistor, a third thermistor, and a fourth thermistor. The first thermistor and the second thermistor are connected to the first conductive portion. The first thermistor, the second thermistor, the third thermistor, and the fourth thermistor are connected to the second conductive portion. The third thermistor and the fourth thermistor are connected to the third conductive portion.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIGS. 7A, 7B, and 7C illustrate a temperature sensing circuit according to embodiments described herein.

DETAILED DESCRIPTION

Embodiments described herein relate to a temperature sensing circuit for a device, such as a battery pack, a power tool, or a battery pack charger. The temperature sensing circuit includes a substrate material (e.g., a flexible substrate material), a first conductive portion, a second conductive portion, a third conductive portion, and a plurality of thermistors including a first thermistor and a second thermistor. The first conductive portion is connected to the first thermistor. The first and second thermistors are connected to the second conductive portion. The third conductive portion is connected to the second thermistor. The first conductive portion and the third conductive portion are configured to connect to a controller of the device to provide a signal to the controller. The controller is configured to receive the signal and determine a temperature associated with the device based on the received signal. The signal provided to the controller corresponds to an average of temperatures sensed by the plurality of thermistors. The controller is further configured to provide one or more control signals to control the device based on the temperature associated with the device. In some embodiments, the one or more control signals are configured or operable to control one or more of turning on a fan, turning off a fan, increasing a rotational speed of a fan, and decreasing a rotational speed of a fan.

Figure 1:
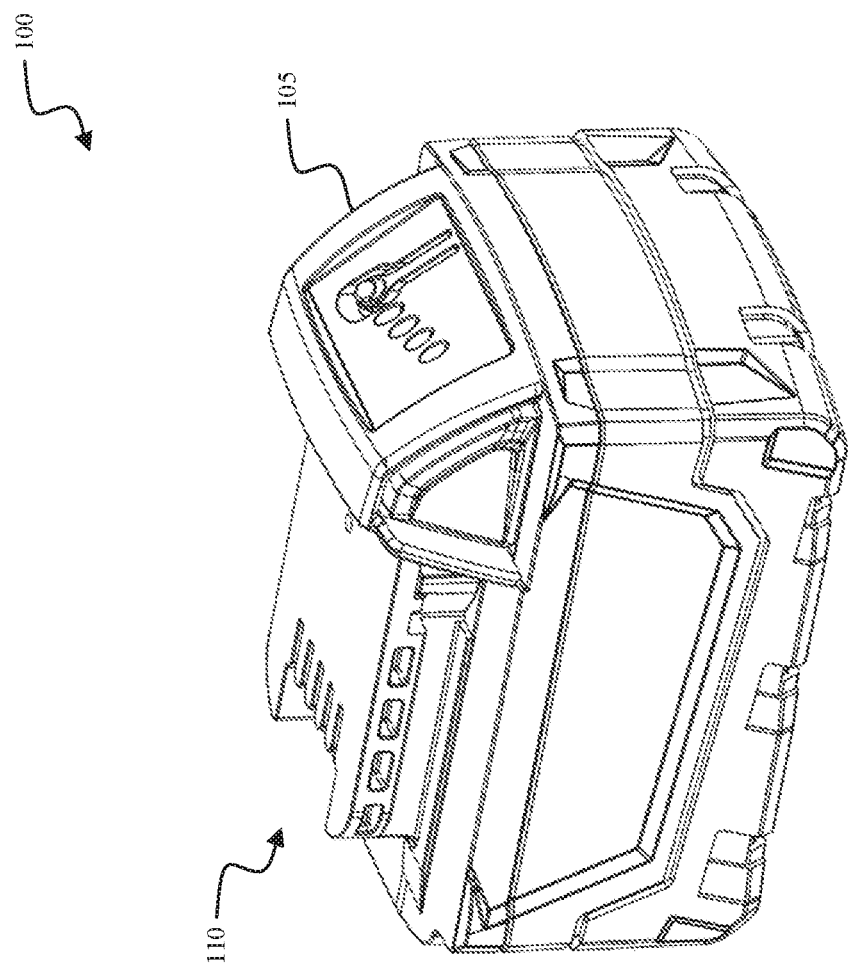
FIG. 1 illustrates a battery pack that includes a temperature sensing circuit.

FIG. 1 illustrates a battery pack 100 that includes a temperature sensing circuit. The battery pack 100 includes a housing 105 and an interface portion 110 for connecting the battery pack 100 to a device (e.g., a power tool). The temperature sensing circuit includes a plurality of thermistors for sensing a temperature associated with the battery pack 100. The temperature sensing circuit is configured to provide a signal to a controller of the battery pack 100. The controller of the battery pack 100 is configured to receive the signal from the temperature sensing circuit and determine a temperature associated with the battery pack 100 based on the signal received from the temperature sensing circuit. A temperature sensing circuit that can be used with the battery pack 100 is described below with respect to FIGS. 5A, 5B, 5C, 7A, 7B, 7C, 8A, 8B, 8C, and 8D.

Figure 2:
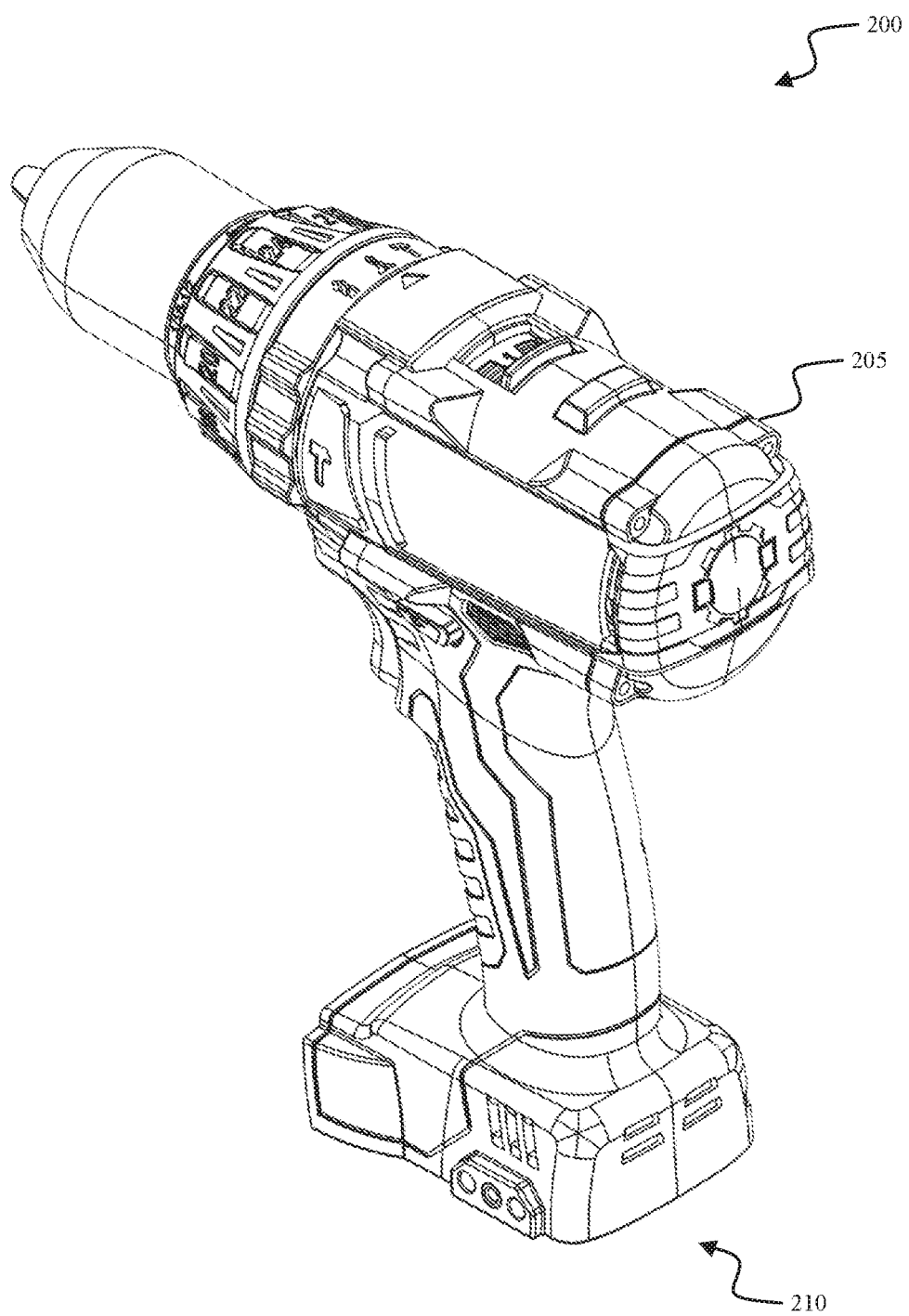
FIG. 2 illustrates a power tool that includes a temperature sensing circuit.

FIG. 2 illustrates a power tool 200 that includes a temperature sensing circuit. The power tool 200 includes a housing 205 and an interface portion 210 for connecting the power tool to a battery pack (e.g., battery pack 100). The temperature sensing circuit includes a plurality of thermistors for sensing a temperature associated with the power tool 200. The temperature sensing circuit is configured to provide a signal to a controller of the power tool 200. The controller of the power tool 200 is configured to receive the signal from the temperature sensing circuit and determine a temperature associated with the power tool 200 based on the signal received from the temperature sensing circuit. A temperature sensing circuit that can be used with the power tool 200 is described below with respect to FIGS. 5A, 5B, 5C, 7A, 7B, 7C, 8A, 8B, 8C, and 8D.

Figure 3:
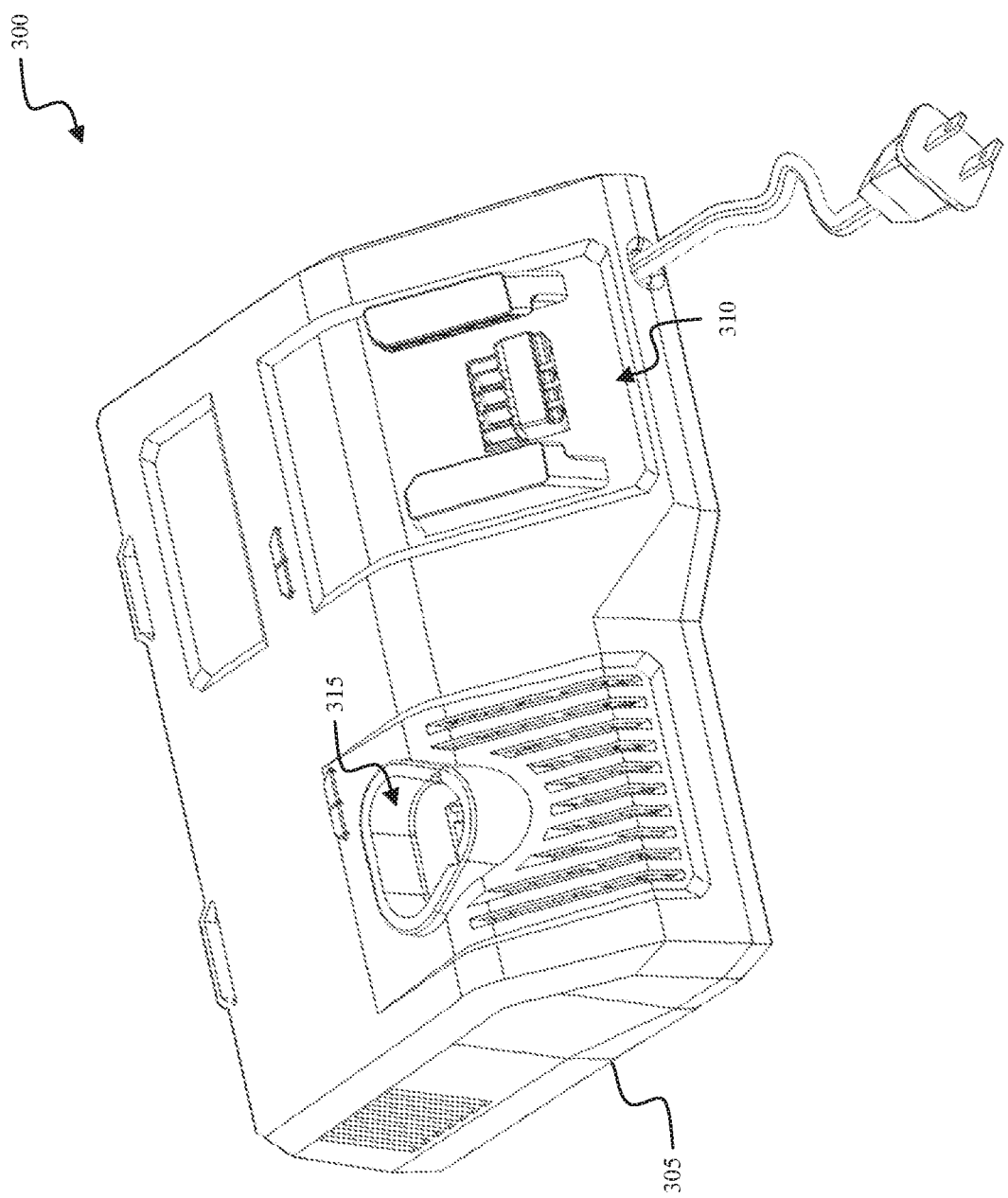
FIG. 3 illustrates a battery pack charger that includes a temperature sensing circuit.

FIG. 3 illustrates a battery pack charger 300 that includes a temperature sensing circuit. The battery pack charger 300 includes a housing 305 and interface portions 310, 315 for connecting the battery pack charger 300 to one or more battery packs (e.g., battery pack 100). The temperature sensing circuit includes a plurality of thermistors for sensing a temperature associated with the battery pack charger 300. The temperature sensing circuit is configured to provide a signal to a controller of the battery pack charger 300. The controller of the battery pack charger is configured to receive the signal from the temperature sensing circuit and determine a temperature associated with the battery pack charger 300 based on the signal received from the temperature sensing circuit. A temperature sensing circuit that can be used with the battery pack charger 300 is described below with respect to FIGS. 5A, 5B, 5C, 7A, 7B, 7C, 8A, 8B, 8C, and 8D.

Figure 4:
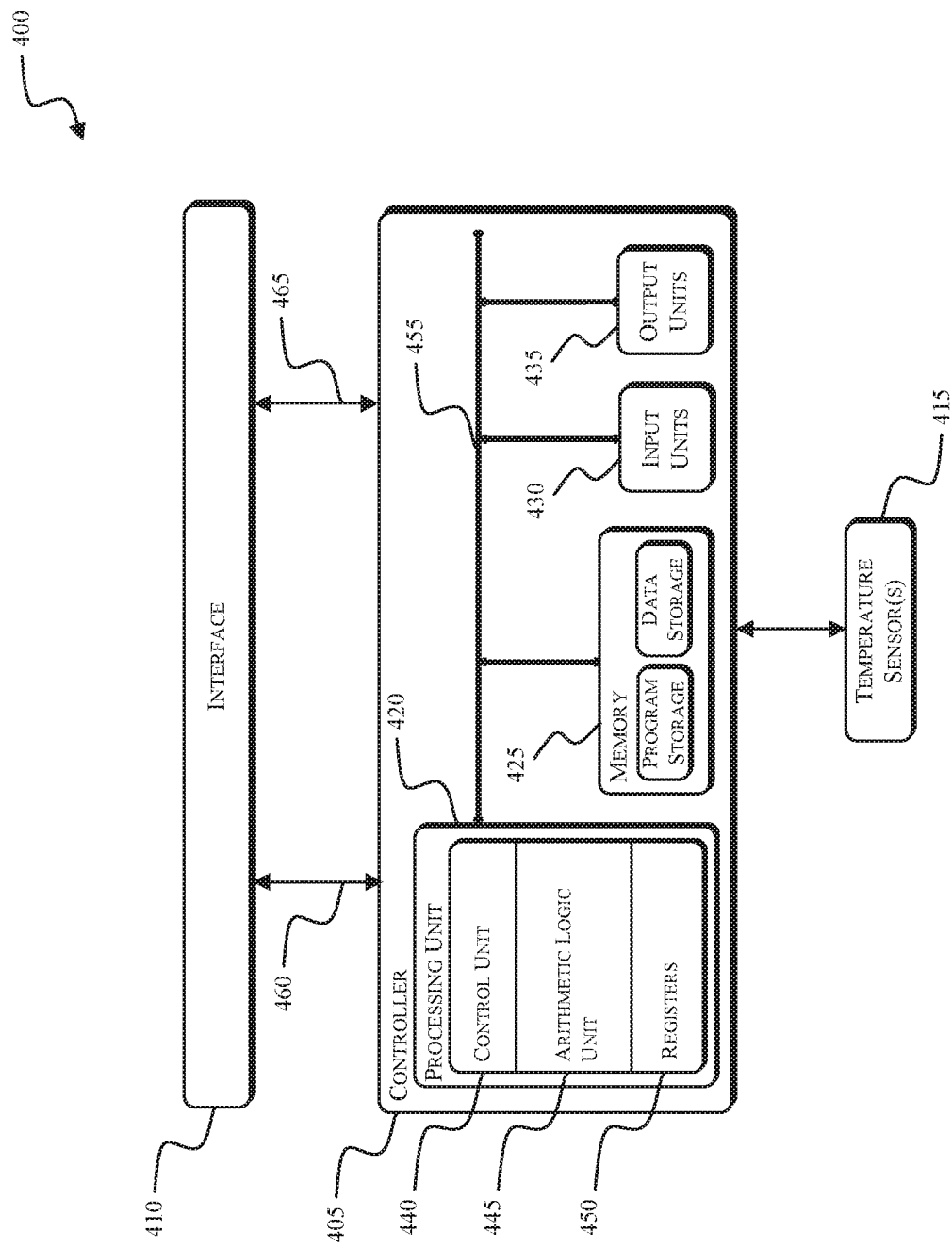
FIG. 4 illustrates a control system including a temperature sensing circuit.
Figure 5:
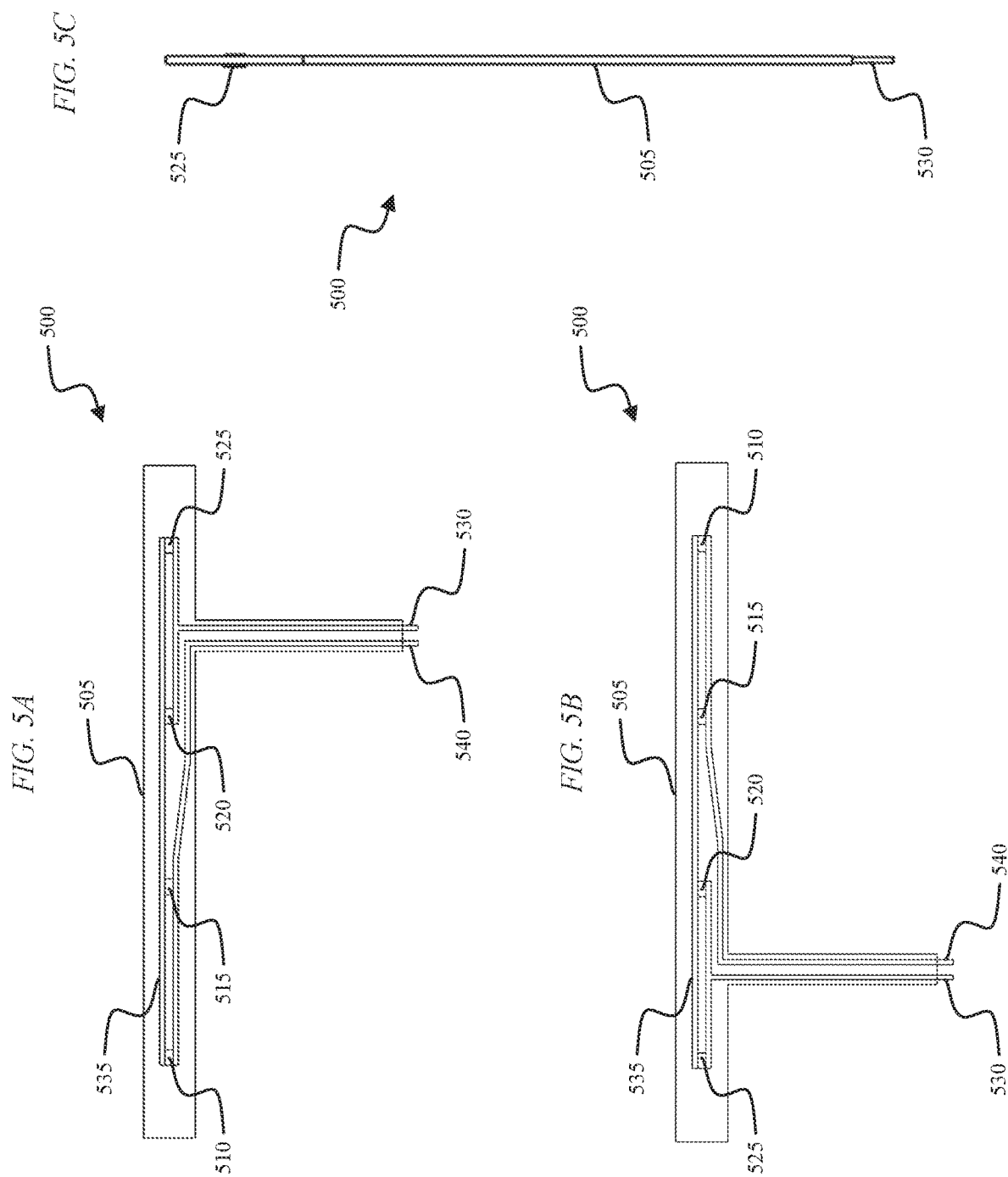
FIGS. 5A, 5B, and 5C illustrate a temperature sensing circuit according to embodiments described herein.

FIG. 4 illustrates a control system 400. The control system 400 can be included in, for example, the battery pack 100, the power tool 200, or the battery pack charger 300. The control system 400 includes a controller 405. The controller 405 is electrically and/or communicatively connected to a variety of modules or components of the battery pack 100, the power tool 200, or the battery pack charger 300. For example, the illustrated controller 405 is connected to an interface 410 (e.g., an interface of the battery pack 100, the power tool 200, or the battery pack charger 300). The controller 405 is also connected to one or more temperature sensors or temperature sensing circuits 415. The controller 405 includes combinations of hardware and software that are operable to, among other things, control the operation of the battery pack 100, the power tool 200, or the battery pack charger 300, measure a temperature associated with the battery pack 100, the power tool 200, or the battery pack charger 300, etc.

In some embodiments, the controller 405 includes a plurality of electrical and electronic components that provide power, operational control, and protection to the components and modules within the controller 405 and/or the battery pack 100, the power tool 200, or the battery pack charger 300. For example, the controller 405 includes, among other things, a processing unit 420 (e.g., a microprocessor, a microcontroller, or another suitable programmable device), a memory 425, input units 430, and output units 435. The processing unit 420 includes, among other things, a control unit 440, an ALU 445, and a plurality of registers 450 (shown as a group of registers in FIG. 4), and is implemented using a known computer architecture (e.g., a modified Harvard architecture, a von Neumann architecture, etc.). The processing unit 420, the memory 425, the input units 430, and the output units 435, as well as the various modules connected to the controller 405 are connected by one or more control and/or data buses (e.g., common bus 455). The control and/or data buses are shown generally in FIG. 4 for illustrative purposes. The use of one or more control and/or data buses for the interconnection between and communication among the various modules and components would be known to a person skilled in the art in view of the invention described herein.

The memory 425 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 420 is connected to the memory 425 and executes software instructions that are capable of being stored in a RAM of the memory 425 (e.g., during execution), a ROM of the memory 425 (e.g., on a generally permanent basis), or another non-transitory computer readable medium such as another memory or a disc. Software included in the implementation of the battery pack 100, the power tool 200, or the battery pack charger 300 can be stored in the memory 425 of the controller 405. The software includes, for example, firmware, one or more applications, program data, filters, rules, one or more program modules, and other executable instructions. The controller 405 is configured to retrieve from the memory 425 and execute, among other things, instructions related to the control processes and methods described herein. In other constructions, the controller 405 includes additional, fewer, or different components.

The interface 410 includes a combination of mechanical components and electrical components configured to and operable for interfacing (e.g., mechanically, electrically, and communicatively connecting) the battery pack 100, the power tool 200, or the battery pack charger 300 with another device. For example, the interface 410 is configured to receive power via a power line 460 between the controller 405 and the interface 410. The interface 410 is also configured to communicatively connect to the controller 405 via a communications line 465.

The controller 405 determines a temperature associated with the battery pack 100, the power tool 200, or the battery pack charger 300 using the one or more temperature sensors or temperature sensing circuits 415. After determining the temperature of the battery pack 100, the power tool 200, or the battery pack charger 300, the controller 405 is configured to provide information and/or control signals to another component of the battery pack 100, the power tool 200, or the battery pack charger 300 (e.g., a fan, a charge FET, a discharge FET, etc.). The control signals can be configured to, for example, turn a fan ON, turn a fan OFF, increase the rotational speed of the fan, decrease the rotational speed of the fan, etc. In other embodiments, the controller 405 takes a different control action based on the one or more signals received from the one or more temperature sensors or temperature sensing circuits 415 (e.g., disabling the battery pack 100, turning OFF the power tool 200, or turning OFF the battery pack charger 300).

FIGS. 5A, 5B, and 5C illustrate a temperature sensing circuit 500 according to embodiments described herein. The temperature sensing circuit 500 includes a material or substrate material 505. The material 505 forms, for example, a flexible printed circuit board that includes a plurality of thermistors 510, 515, 520, and 525. The thermistors 520 and 525 are each connected to a first conductive portion 530 of the temperature sensing circuit 500. The thermistors 510, 515, 520, and 525 are each connected to a second conductive portion 535 of the temperature sensing circuit 500. The thermistors 510 and 515 are each connected to a third conductive portion 540 of the temperature sensing circuit 500. The first conductive portion 530 and the third conductive portion 540 are configured to connect to, for example, the controller 405. In some embodiments, the signals provided to the controller 405 from the temperature sensing circuit 500 correspond to an average of the temperatures sensed by each of the thermistors 510, 515, 520, and 525.

Figure 6:
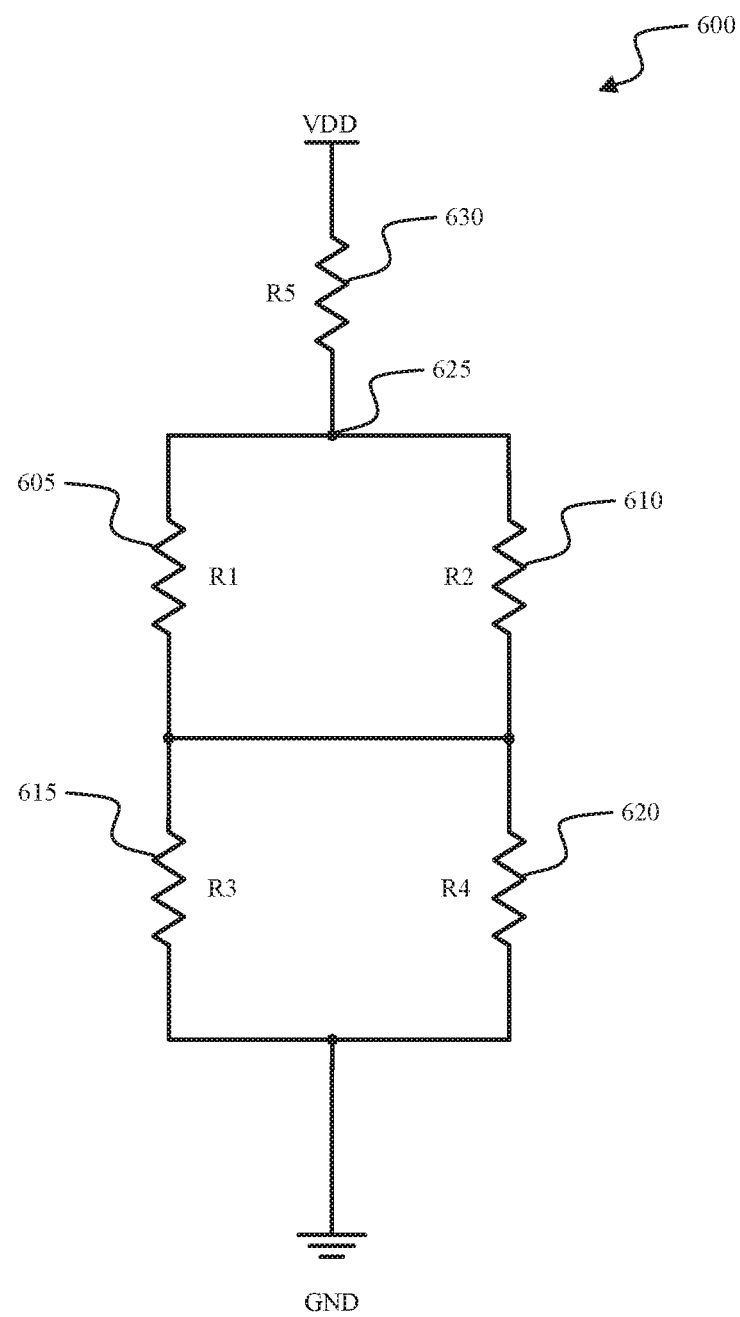
FIG. 6 is an electrical schematic diagram of a temperature sensing circuit according to embodiments described herein.
Figure 8A:
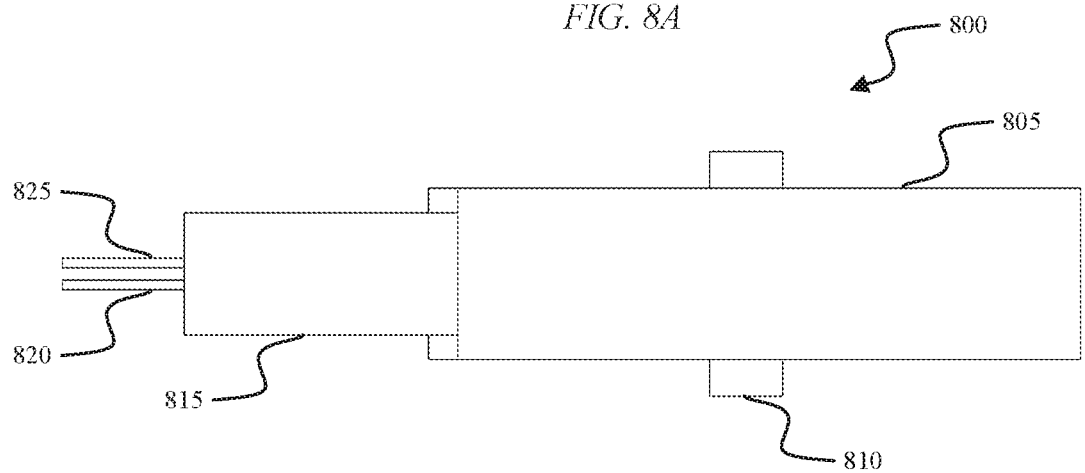
FIGS. 8A, 8B, 8C, and 8D illustrate a temperature sensing circuit according to embodiments described herein.
Figure 8B:
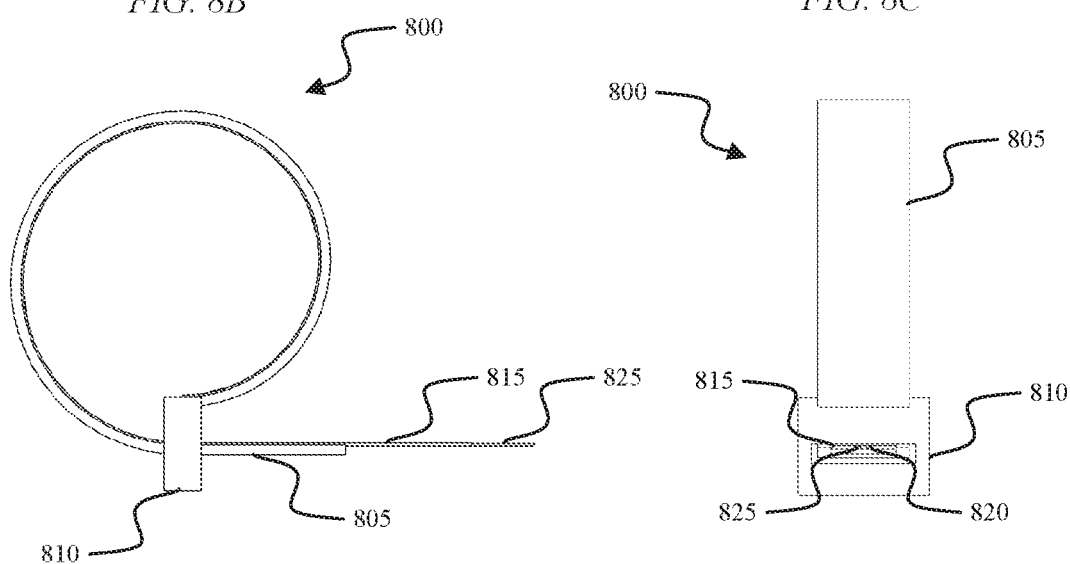
Figure 8C:
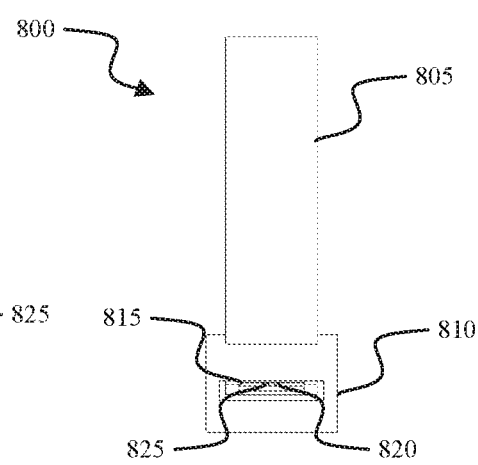
Figure 8D:
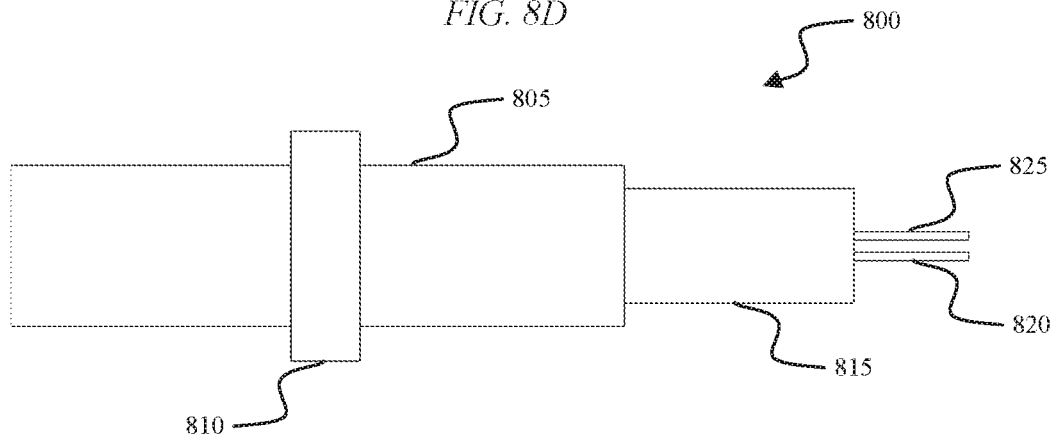

FIG. 6 is an electrical schematic diagram of a temperature sensing circuit 600. The temperature sensing circuit 600 corresponds to, for example, the temperature sensing circuit 500 illustrated and described with respect to FIG. 5. The temperature sensing circuit 600 includes a first thermistor 605 ("R1"), a second thermistor 610 ("R2"), a third thermistor 615 ("R3"), and a fourth thermistor 620 ("R4"). The first thermistor 605 is connected in parallel with the second thermistor 610. The third thermistor 615 is connected in parallel with the fourth thermistor 620. A combined resistance of the first thermistor 605 and second thermistor 610 is connected in series with a combined resistance of the third thermistor 615 and the fourth thermistor 620. A total combined resistance, $R_C$, of the first thermistor 605, the second thermistor 610, the third thermistor 615, and the fourth thermistor 620 can be calculated as shown below in EQN. 1:

$$R_C = \left(\frac{1}{\frac{1}{R1}+\frac{1}{R2}}\right) + \left(\frac{1}{\frac{1}{R3}+\frac{1}{R4}}\right) \quad \text{EQN. 1}$$

The combined resistance, $R_C$, of the first thermistor 605, the second thermistor 610, the third thermistor 615, and the fourth thermistor 620 approximately equals the average resistance of the first thermistor 605, the second thermistor 610, the third thermistor 615, and the fourth thermistor 620.

The average resistance corresponds to the average sensed temperature of the thermistors. As an illustrative example, for R1=15Ω, R2=20Ω, R3=20Ω, and R4=25Ω, EQN. 1 produces approximately the average resistance of 20Ω for the four thermistors. The combined resistance, $R_C$, forms a voltage divider circuit with a fifth thermistor 630 ("R5"). A tap point 625 of the voltage divider circuit can be provided to the controller 405. Based on the value of the voltage signal the controller 405 receives, the controller 405 determines the approximate average temperature sensed by the first thermistor 605, the second thermistor 610, the third thermistor 615, and the fourth thermistor 620. As such, the temperature sensing circuit 600 is configured to produce a four-point average temperature measurement related to, for example, the battery pack 100, the power tool 200, and/or the charger 300. In other embodiments, a different number of thermistors is used. In some embodiments, the number of parallel connected thermistors in each circuit branch equals the number of series connected branches (e.g., three circuit branches of three parallel connected thermistors).

FIGS. 7A, 7B, and 7C illustrate a temperature sensing circuit 700 according to embodiments described herein. The temperature sensing circuit 700 includes a material or substrate material 705. The material 705 forms, for example, a flexible printed circuit board that includes a plurality of thermistors 710, 715, 720, and 725. The thermistors 720 and 725 are each connected to a first conductive portion 730 of the temperature sensing circuit 700. The thermistors 710, 715, 720, and 725 are each connected to a second conductive portion 735 of the temperature sensing circuit 700. The thermistors 710 and 715 are each connected to a third conductive portion 740 of the temperature sensing circuit 700. The first conductive portion 730 and the third conductive portion 740 are configured to connect to, for example, the controller 405. In some embodiments, the signals provided to the controller 405 from the temperature sensing circuit 700 correspond to an average of the temperatures sensed by each of the thermistors 710, 715, 720, and 725. The temperature sensing circuit 700 is configured to produce a four-point average temperature measurement related to, for example, the battery pack 100, the power tool 200, and/or the charger 300, as described above with respect to temperature sensing circuit 600 and FIG. 6.

FIGS. 8A, 8B, 8C, and 8D illustrate a temperature sensing circuit 800 according to embodiments described herein. The temperature sensing circuit 800 includes a circuit board holder 805 having a retention structure or member 810 for receiving a printed circuit board 815. The printed circuit board 815 is similar to the materials 505 and 705 described above with respect to FIGS. 5A, 5B, 5C, 7A, 7B, and 7C. The printed circuit board 815 is, for example, a flexible circuit board that is configured to be received by the circuit board holder 805. In some embodiments, the circuit board holder 805 and the printed circuit board 815 are each configured to be flexible or bendable and the temperature sensing circuit 800 can be folded around, for example, a battery cell or multiple battery cells. The retention structure 810 is configured to, for example, hold the printed circuit board 815 in place when the printed circuit board 815 is wrapped around a battery cell. The printed circuit board 815 includes a first conductive portion 820 and a second conductive portion 825. In some embodiments, the temperature sensing circuit 800 includes a plurality of thermistors (e.g., four or more thermistors) like the temperature sensing circuits 500, 700.

Thus, embodiments described herein provide, among other things, a temperature sensing circuit that includes a plurality of thermistors. Various features and advantages are set forth in the following claims.

What is claimed is:

1. A temperature sensing circuit for a device, the circuit comprising:
   a substrate material;
   a first conductive portion, a second conductive portion, and a third conductive portion associated with the substrate material; and
   a plurality of thermistors associated with the substrate material for sensing a temperature associated with the device, wherein:
   the plurality of thermistors include a first thermistor and a second thermistor,
   the first thermistor is connected to the first conductive portion,
   the first thermistor and the second thermistor are both connected to the second conductive portion, and
   the second thermistor is connected to the third conductive portion,
   wherein the first conductive portion and the third conductive portion are configured to connect to a controller of the device to provide a signal to the controller,
   wherein the signal corresponds to an average of temperatures sensed by the plurality of thermistors.

2. The temperature sensing circuit of claim 1, wherein the controller is configured to:
   determine the temperature associated with the device based on the signal.

3. The temperature sensing circuit of claim 2, wherein the controller is configured to:
   generate a control signal to control the device based on the temperature associated with the device.

4. The temperature sensing circuit of claim 3, wherein the control signal is configured to turn on a fan.

5. The temperature sensing circuit of claim 1, wherein the substrate material is a print circuit board (PCB).

6. The temperature sensing circuit of claim 5, wherein the PCB is folded around one or more battery cells of the device.

7. The temperature sensing circuit of claim 1, wherein:
   the plurality of thermistors include a third thermistor and a fourth thermistor;
   the third thermistor is connected to the first conductive portion;
   the third thermistor and the fourth thermistor are connected to the second conductive portion; and
   the fourth thermistor is connected to the third conductive portion.

8. The temperature sensing circuit of claim 1, wherein the device is a battery pack.

9. A method of determining a temperature associated with a device, the device including a temperature sensing circuit connected to a controller of the device, the temperature sensing circuit including a first conductive portion, a second conductive portion, and a third conductive portion associated with a substrate material, a plurality of thermistors, the plurality of thermistors including a first thermistor, and a second thermistor, the first thermistor connected to the first conductive portion, the first thermistor and the second thermistor connected to the second conductive portion, the second thermistor connected to the third conductive portion, the method comprising:
   sensing the temperature associated with the device using the temperature sensing circuit;
   receiving, by the controller, a signal from the temperature sensing circuit; and
   determining the temperature associated with the device based on the signal,
   wherein the signal corresponds to an average of temperatures sensed by the plurality of thermistors.

10. The method of claim 9, the method further comprising:
    generating, by the controller, a control signal to control the device based on the temperature associated with the device.

11. The method of claim 10, wherein the control signal turns on a fan.

12. The method of claim 9, wherein the substrate material is a print circuit board (PCB).

13. The method of claim 9, wherein the device is a battery pack.

14. A temperature sensing circuit for a device, the temperature sensing circuit comprising:
    a substrate material;
    a first conductive portion, a second conductive portion, and a third conductive portion associated with the substrate material; and
    a plurality of thermistors associated with the substrate material for sensing a temperature associated with the device, wherein:
    the plurality of thermistors include a first thermistor, a second thermistor, a third thermistor, and a fourth thermistor,
    the first thermistor and the second thermistor connected to the first conductive portion,
    the first thermistor, the second thermistor, the third thermistor, and the fourth thermistor connected to the second conductive portion, and
    the third thermistor and the fourth thermistor connected to the third conductive portion,
    wherein the first conductive portion and the third conductive portion are configured to connect to a controller of the device to provide a signal to the controller,
    wherein the signal corresponds to an average of temperatures sensed by the plurality of thermistors.

15. The temperature sensing circuit of claim 14, wherein the controller is configured to:
    determine the temperature associated with the device based on the signal.

16. The temperature sensing circuit of claim 15, wherein the controller is configured to:
    generate a control signal to control the device based on the temperature associated with the device.

* * * * *